(12) United States Patent
Stenerud

(10) Patent No.: US 6,399,161 B1
(45) Date of Patent: Jun. 4, 2002

(54) METHOD FOR COATING A METAL SHAFT WITH PLASTIC

(75) Inventor: Lars S. Stenerud, Innfjorden (NO)

(73) Assignee: Plasto AS, Andalsnes (NO)

( * ) Notice: Subject to any disclaimer, the term of this patent is extended or adjusted under 35 U.S.C. 154(b) by 0 days.

(21) Appl. No.: 09/446,261

(22) PCT Filed: Jun. 19, 1998

(86) PCT No.: PCT/NO98/00189

§ 371 (c)(1),
(2), (4) Date: Dec. 21, 1999

(87) PCT Pub. No.: WO98/58793

PCT Pub. Date: Dec. 30, 1998

(30) Foreign Application Priority Data

Jun. 24, 1997 (NO) .......................................... 19972949

(51) Int. Cl.[7] .................................................. B05D 3/12

(52) U.S. Cl. ........................ 427/600; 427/356; 427/358; 427/444; 264/299; 264/443; 264/447

(58) Field of Search .......................... 427/370, 9, 356, 427/358, 320, 444, 235, 239, 600; 264/443, 445–448, 342 R, 345, 407, 447, 635, 299

(56) References Cited

U.S. PATENT DOCUMENTS

| 3,669,738 A | 6/1972 | Cottis et al. |
| 3,840,384 A | 10/1974 | Reade et al. |
| 5,723,791 A | 3/1998 | Koch et al. |

FOREIGN PATENT DOCUMENTS

JP     57-103925     6/1982

*Primary Examiner*—Fred J. Parker
(74) *Attorney, Agent, or Firm*—Young & Thompson

(57) ABSTRACT

A metal shaft is covered with plastic. A metal sleeve is moved relative to the plastic covered shaft. The sleeve and the plastic covered shaft are ultrasoncially vibrated to calibrate the plastic on the shaft.

8 Claims, 1 Drawing Sheet

METHOD FOR COATING A METAL SHAFT WITH PLASTIC

FIELD OF THE INVENTION

The present invention relates to a method for coating an article with plastic. The invention is especially directed towards the coating of shafts with plastic, and the new method makes use of an ultrasound source. The method entails a favourable production solution for depositing plastic on metal shafts in a more accurate way than with today's solutions. The metal shafts are preferably made of steel, aluminium or manganese, but the invention is not limited to coating these metals.

The products that are coated by means of the inventive method may, e.g., by sliding surfaces on shafts that are used as steering wheel columns in cars. Great precision is required here to be able to move the steering wheel back and forth and to absorb impact in the event of a collision.

BACKGROUND OF THE INVENTION

Today, there are several known methods of coating a shaft.

One previously known method is to use injection moulding, where a shaft is placed inside a mould, and plastic is injected into the mould at high pressure.

A second method is to use an extruded plastic sleeve which has been cut to a suitable length and is of the right shape and size. The plastic sleeve is passed onto the shaft, heat is subsequently applied to shrink the plastic and then ultrasound to calibrate the plastic on the shaft against the sleeve. By calibrating the shaft against the sleeve the proportions are adjusted so they are within the tolerances when the shaft is passed into the sleeve at the same time as ultrasound is applied. This is done to obtain better adaptation of the plastic coating and the sleeve than earlier, as the sleeves have different shapes and sizes.

Another method is to use a plastic powder which is applied to a heated metal. The temperature in the process must be higher than the melting point of the plastic. In this way the powder will form a thin layer of plastic on the metal.

SUMMARY OF THE INVENTION

The present invention is based on known technology and exploits it further to make products having a greater accuracy within specified tolerance limits. With the inventive method it is possible to operate easily within tolerance limits of from +/−3/100 to +/−3/1000.

According to the invention, the methods comprises depositing plastic on a shaft, and then moving a metal sleeve over the shaft and plastic sleeve, while ultrasound is employed to calibrate the plastic on the shaft.

The present invention is directed towards a method for applying a coating of plastic on a metal shaft, wherein:

(i) plastic is applied onto the shaft by means of injection moulding;

(ii) an extruded plastic sleeve cut to the right length is placed on the shaft;

(iii) the plastic is sprayed onto the shaft with the aid of a sprayer;

(iv) the plastic is applied by lowering the shaft into a plastic solution; or (v) plastic is applied in powder form to the heated metal of the shaft;

characterised in that after the plastic has been applied, a metal sleeve is moved relative to the shaft and the plastic applied thereto at the same time as the whole unit is supplied with ultrasound to calibrate the plastic sleeve on the shaft.

BRIEF DESCRIPTION OF THE DRAWING

The invention will be explained in more detail below with reference to.

DETAILED DESCRIPTION OF THE PREFERRED EMBODIMENTS

Figure 1:
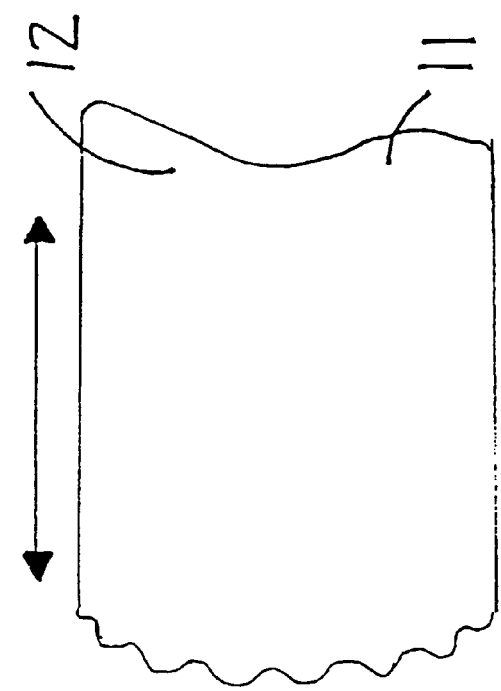
FIG. 1 which is a schematic illustration of a shaft and a metal sleeve.
Figure 1:
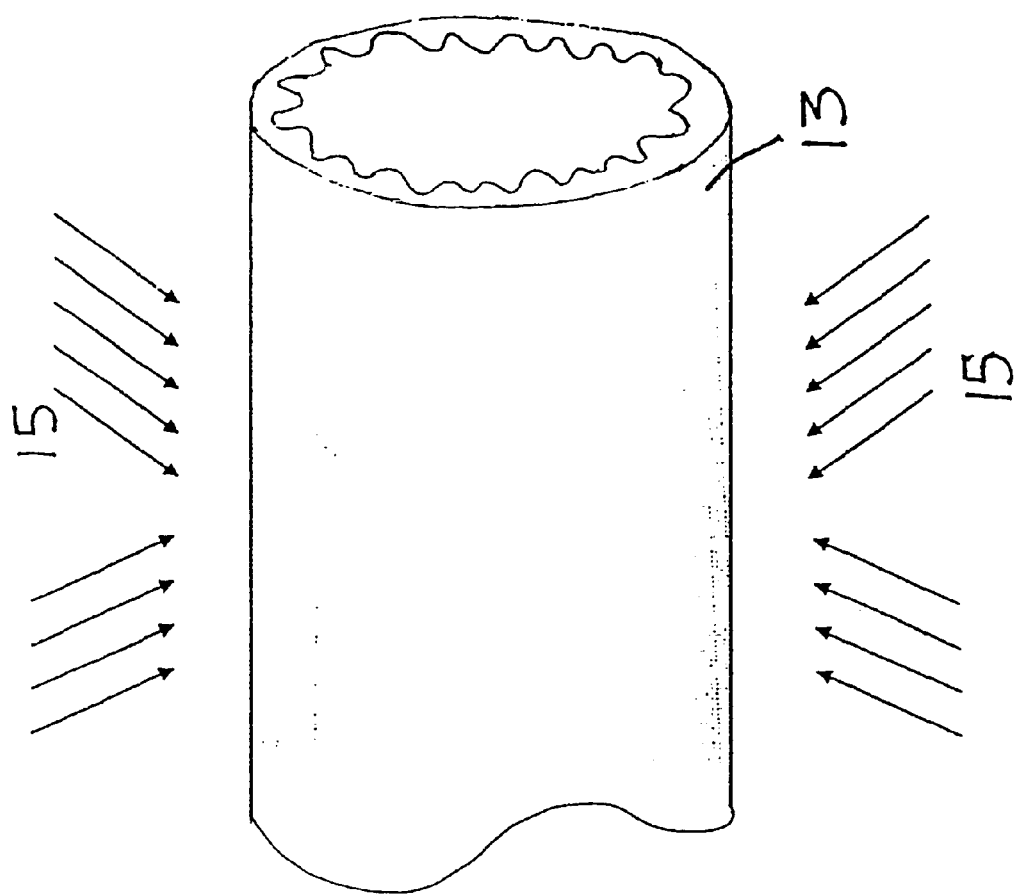

The figure shows a workpiece in which a shaft 11 is mounted, which, for example, may be made of steel, aluminium or manganese. A plastic sleeve 12 has been applied to the shaft. The device also consists of a metal sleeve 13 which is complementary to the shaft 11. The whole unit is placed in an ultrasound apparatus (not shown). The ultrasound apparatus will have special properties as regards ultrasonic strength, dimension and shape, but is not limited to a specific model. The workpiece also has a means which can move the shaft 11 back and forth and in and out of the metal sleeve 13. Alternatively, the metal sleeve 13 can be moved back and forth over the shaft 11, which remains stationary. The ultrasonic waves will initiate vibrations in the plastic and the shaft, and ensure that the surface of the plastic sleeve 12, on account of the frictional heat, melts/shrinks and takes the shape of the external sleeve 13. In the figure the ultrasonic waves are indicated by means of the arrows 15 directed towards the metal sleeve 13.

Alternatively, an extruded plastic sleeve can be used. Again the extruded plastic sleeve is placed on a shaft 11 in the same manner as outlined above in an apparatus where ultrasonic waves generate frictional heat so that the plastic melts and shrinks against the shaft.

As regards the types of plastic used in the process, it is possible to use different types, provided that they have the desired properties.

The time it takes to produce a plastic-coated shaft may be from 20 to 60 seconds depending upon the production line.

The plastic can be deposited on the shaft 11 at a temperature of from about 200–300° C., while the temperature during calibration is between 20° and 60° C. The temperature during calibration is important with a view to tolerances, and this must be taken into is account in the event of, e.g., increased cycle time or extra cooling prior to calibration.

By using the inventive method, articles of high accuracy and precision can be produced within specified tolerance limits. The products made following the inventive method attain a much greater precision than the solutions known at present.

Instead of initially coating the metal shaft with plastic, the metal sleeve can be coated with plastic. By moving the metal shaft relative to the plastic coated sleeve and ultrasonically vibrating the plastic coated sleeve and the metal shaft, the metal shaft is coated with plastic and the plastic coating is calibrated on the metal shaft.

What is claimed is:

1. A method for coating a metal shaft with plastic comprising the steps of:
   (a) coating a metal shaft with plastic;
   (b) moving said plastic coated shaft in and out relative to a metal sleeve; and
   (c) ultrasonically vibrating said plastic coated shaft and said sleeve so that said plastic melts and shrinks and takes the shape of said sleeve.

2. The method according to claim 1, wherein said step (b) comprises moving said metal sleeve while said plastic coated shaft remains stationary.

3. The method according to claim 1, wherein said step (b) comprises moving said plastic coated shaft while said metal sleeve remains stationary.

4. The method according to claim 1, wherein said step (a) comprises applying plastic to said metal shaft heated to a temperature of from about 200–300° C.

5. The method according to claim 4, further comprising cooling said plastic coated shaft to a temperature of about 20°–600° C. after said step (a).

6. The method according to claim 1, wherein said steps (b) and (c) are performed simultaneously.

7. A method for coating a metal shaft with plastic comprising the steps of:

(a) coating the inside of a metal sleeve with plastic;

(b) moving a metal shaft in and out relative to said plastic coated sleeve; and (c) ultrasonically vibrating said plastic coated sleeve and said shaft so that said plastic melts, coats said shaft and takes the shape of said sleeve.

8. The method according to claim 7, wherein said steps (b) and (c) are performed simultaneously.

* * * * *